United States Patent [19]

Omori et al.

[11] Patent Number: 5,036,425
[45] Date of Patent: Jul. 30, 1991

[54] MONOLITHIC CERAMIC CAPACITOR

[75] Inventors: Nagato Omori, Nagaokakyo; Harunobu Sano, Kyoto; Yoshiaki Kohno, Nagaokakyo; Yukio Sakabe, Kyoto, all of Japan

[73] Assignee: Murata Manufacturing Co., Ltd., Japan

[21] Appl. No.: 482,980

[22] Filed: Feb. 21, 1990

[30] Foreign Application Priority Data

Feb. 22, 1989 [JP] Japan .................................. 1-44407

[51] Int. Cl.$^5$ .............................................. H01G 4/08
[52] U.S. Cl. .................................................. 361/321
[58] Field of Search ............................. 361/320, 321; 501/134–138

[56] References Cited

U.S. PATENT DOCUMENTS 4,101,952 7/1978 Burn ..................................... 361/320
4,959,333 9/1990 Mori et al. .......................... 501/136

Primary Examiner—Donald A. Griffin
Attorney, Agent, or Firm—Ostrolenk, Faber, Gerb & Soffen

[57] ABSTRACT

A monolithic ceramic capacitor comprises a plurality of dielectric ceramic layers united into one body, a plurality of internal electrodes formed between adjacent dielectric ceramic layers, and external electrodes formed on opposite sides of the united ceramic each being connected to alternate internal electrodes. The internal electrodes are formed of a copper or a copper alloy. The dielectric ceramic layers are formed of a dielectric ceramic composition including strontium titanate, bismuth oxide and an antireducing agent which prevents the composition from reduction. The antireducing agent has a composition expressed by the general formula:

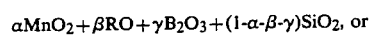

$\alpha MnO_2 + \beta RO + \gamma B_2O_3 + (1-\alpha-\beta-\gamma)SiO_2$, or

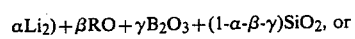

$\alpha Li_2 + \beta RO + \gamma B_2O_3 + (1-\alpha-\beta-\gamma)SiO_2$, or

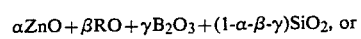

$\alpha ZnO + \beta RO + \gamma B_2O_3 + (1-\alpha-\beta-\gamma)SiO_2$, or wherein RO is at least one oxide selected from the group consisting of MgO, CaO, SrO and BaO, and $\alpha, \beta$ and $\gamma$ are molar percentages of the respective components and take a value within the following respective ranges, $5 \leq \alpha \leq 20$, $10 \leq \beta \leq 60$, $20 \leq \gamma \leq 40$.

8 Claims, 1 Drawing Sheet

MONOLITHIC CERAMIC CAPACITOR

BACKGROUND OF THE INVENTION

1. Field of the Invention

The present invention relates to a monolithic ceramic capacitor.

2. Description of the Prior Art

Monolithic ceramic capacitors generally comprise a plurality of stacked dielectric ceramic layers, a plurality of internal electrodes formed between two adjacent dielectric ceramic layers, and external electrodes formed on opposite sides of the stacked ceramic layers and connected to the internal electrodes.

Stronium titanate and a small amount of bismuth incorporated wherein have previously been used as dielectric materials because of their relatively large dielectric constant, small voltage dependency of dielectric constant and small dielectric loss. Typical dielectric ceramics of the prior art include a composition of a $SrTiO_3\text{-}PbTiO_3\text{-}Bi_2O_3\text{·}nTiO_2$ system (Japanese patent Laid-open No. 49-30900), a dielectric ceramic composition of a $SrTiO_3\text{-}MgTiO_3\text{-}Bi_2O_3\text{-}TiO_2\text{-}Pb_3O_4$ system (Japanese patent publication No. 59-8923), a dielectric ceramic composition of a $SrTiO_3\text{-}CaTiO_3\text{-}Bi_2O_3\text{·}nTiO_2$ system (Laid-open No. 59-20908), and a If such compositions are used in monolithic 60-145951).

If such a composition is applied to monolithic ceramic capacitors, the internal electrodes is should be made of material such as platinum and silver-palladium alloys which have high melting points and high resistance to oxidation at high temperatures. This is because the compositions have high sintering temperatures of not less than 1120° C. A drawback to using platinum and silver-palladium alloy is their high cost. In addition, if any silver-palladium alloy is used as the internal electrode material, it causes migration of silver into the ceramic layers, resulting in lowering the electrical properties of the capacitors. Further, the silver-palladium alloy causes increased equivalent series resistance of the capacitors because of its low conductivity.

To solve these problems, use of copper or a copper alloy has been proposed as a material for internal electrodes because these materials are low in price and high in conductivity. In order to use copper or a copper alloy as an internal electrode material, it is required to fire the dielectric ceramic composition in a reducing atmosphere since such a material has a low melting point and is easily oxidized at the sintering temperature of the dielectric ceramic compositions of the prior art. However, if the dielectric ceramic compositions of the prior art are fired in reducing atmospheres, the bismuth oxide contained therein is reduced during firing, resulting in lowering of the insulating resistance. Thus, it is impossible to use copper or a copper alloy as a material for internal electrodes.

SUMMARY OF THE INVENTION

It is therefore an object of the present invention to provide an expensive monolithic ceramic capacitor which does not experience decrease in electrical properties as a result of.

According to the present invention, there is provided a monolithic ceramic capacitor including a plurality of dielectric ceramic layers united into one body, a plurality of internal electrodes formed between two adjacent dielectric ceramic layers, and external electrodes formed on opposite sides of the united ceramic layers, each being connected to alternate internal electrodes. The dielectric ceramic layers mainly consists of strontium titanate containing bismuth oxide and an antireducing agent which prevents the composition from reduction. The internal electrodes consist essentially of a copper or a copper alloy.

In a preferred embodiment, the internal electrodes may be incorporated with at least one additive selected from the group consisting of glass frit, dielectric powder, and an antireducing agent. The incorporation of such an additive into the internal electrodes prevents the monolithic ceramic capacitors from delamination between adjacent dielectric layers. The sum of the content of additives in the internal electrodes should be not more than 40 wt%.

It is preferred to use a dielectric ceramic composition of a system, $SrTiO_3\text{-}PbTiO_3\text{-}CaTiO_3\text{-}Bi_2O_3\text{-}SnO_2\text{-}TiO_2$, or of a system, $SrTiO_3\text{-}MgTiO_3\text{-}Bi_2O_3\text{-}TiO_2\text{-}Pb_3O_4$ for the dielectric layers of the monolithic ceramic capacitor. Preferably, the dielectric layers are made up of a dielectric ceramic composition expressed by the general formula:

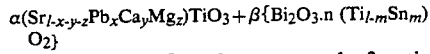

wherein x, y, z, $\alpha$, $\beta$ and m are mole fractions of the respective components or ingredients, each taking a value within the following respective ranges: $\alpha+\beta=1.000$, $0<\beta\leq0.300$, $0.000\leq x\leq0.500$, $0.000\leq y\leq0.500$, $0.000\leq z\leq0.650$, $0.000\leq x+y+z\leq0.750$, $0.000\leq m\leq0.995$, and wherein n takes a value in moles within the following range: $0.00<n\leq5.00$.

To prevent the dielectric ceramic composition from reduction during firing, an antireducing agent may be used therein having a composition expressed by the general formula:

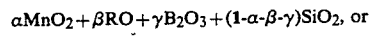

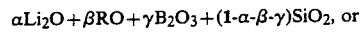

wherein RO is at least one oxide selected from the group consisting of MgO, CaO, SrO and BaO, and wherein $\alpha$, $\beta$ and $\gamma$ are molar percentages of the respective components and take a value within the following respective ranges, $5\leq\alpha\leq20$, $10\leq\beta\leq60$, $20\leq\gamma\leq40$. Copper and copper alloys may be used as a material for internal electrodes;

The incorporation of an antireducing agent into the above basic composition lowers its sintering temperature and prevents it from reduction during firing in a reducing atmosphere. This makes it possible to use copper or a copper alloy as a material for the internal electrodes. In addition, the use of copper or an copper alloy makes it possible to prevent the dielectric layers from migration of the internal electrode material, as well as to reduce the cost of producing the monolithic ceramic capacitors.

The above and other objects, features and advantages of the present invention will become apparent from the following description, taken in connection with the accompanying drawings which show, by way of example only, preferred embodiments thereof.

DETAILED EXPLANATION OF THE PREFERRED EMBODIMENTS

Figure 1:
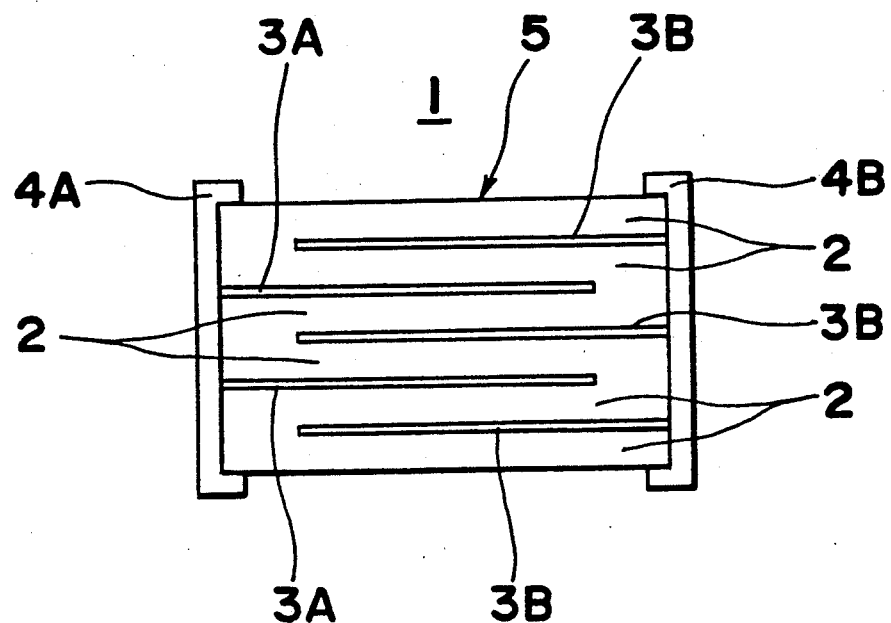
FIG. 1 is a section view of a monolithic ceramic capacitor embodying the present invention.

Referring now to FIG. 1, there is shown a monolithic ceramic capacitor 1, which including a plurality of dielectric ceramic layers 2 stacked and united into one body, a plurality of internal electrodes 3A, 3B alternately formed between adjacent dielectric ceramic layers 2, and external electrodes 4A, 4B formed on opposite sides of a monolithic ceramic body 5. The alternate internal electrodes 3A are connected to the external electrode 4A on one side of the ceramic body 5, whereas the other alternate internal electrodes 3B are connected to the other external electrode 4B on the opposite side of the ceramic body 5. The internal electrodes have a thickness ranging from 0.5 to 5 $\mu$m. The external electrodes generally have a thickness ranging from about 10 to 80 $\mu$m.

The ceramic capacitor 1 may be produced by preparing ceramic green sheets, forming a metal paste layer for an internal electrode on one flat surface of each ceramic green sheet, stacking and pressing the green sheets to form a multilayer green ceramic body, firing it to form a monolithic sintered ceramic body with internal electrodes, forming metal paste layers for external electrodes on opposite sides of the monolithic sintered ceramic body, and baking it at a suitable temperature to form external electrodes.

The above ceramic green sheets may be prepared by first weighing and mixing, in the predetermined molar ratios, a powder of dielectric ceramic composition and an antireducing agent. The resultant mixture is milled in a ball mill by a wet process together with an organic binder of polyvinyl butyral resin and an organic solvent such as ethyl alcohol, and formed into sheets by the doctor blade process.

Figure 2:
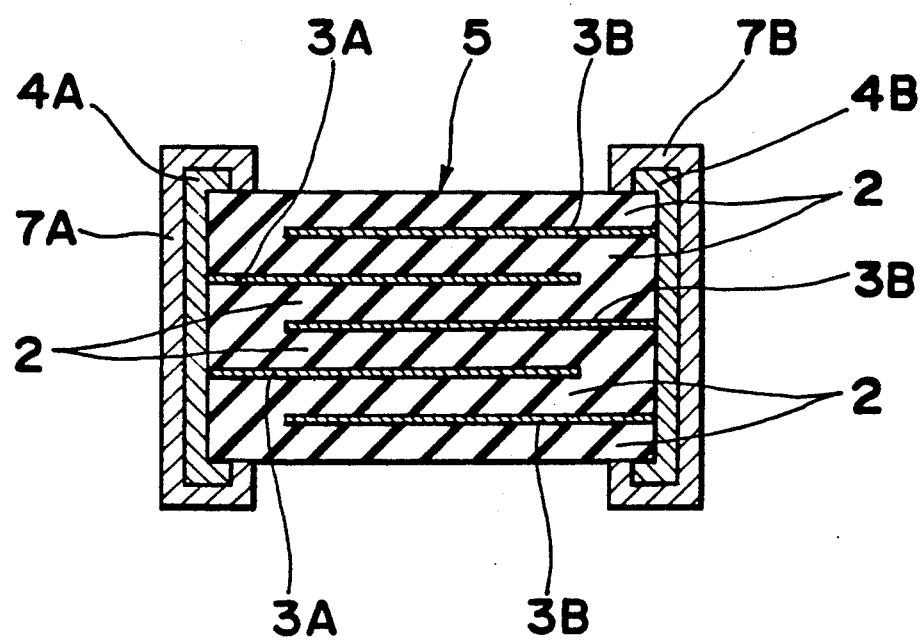
FIG. 2 is a section view of a monolithic ceramic capacitor, showing another embodiment of the present invention.

Copper, copper alloys, silver, palladium and silver-palladium alloys may be used as materials for the external electrodes 4A, 4B. The pair of external electrodes 4A, 4B may be made up of a material different from each other. Further, the external electrodes 4A, 4B may be covered with second layers 7A, 8A made up of another conducting material such as, for example, silver. See FIG. 2.

The metal paste for the internal electrodes 3A, 3B or that for the external electrodes 4A, 4B may be prepared by dispersing metal powder of about 0.1 to 5 $\mu$m in a varnish such as ethyl cellulose dissolved in a solvent such as $\alpha$-terpineol.

EXAMPLE 1

Using the raw materials $SrCO_3$, $Bi_2O_3$, PbO, $CaCO_3$, $TiO_2$ and $SnO_2$, a mixture was prepared to produce a dielectric ceramic composition consisting of 39.9 mol% of $SrTiO_3$, 27.4 mol% of $PbTiO_3$, 21.5 mol% of $CaTiO_3$, 4.3 mol% of $Bi_2O_3$, 1.8 mol% of $SnO_2$ and 11.1 mol% of $TiO_2$. The mixture was wet-milled for 16 hours with a ball mill, dried by evaporation, placed in a zirconia saggar, calcined at 900° to 950° C. for 2 hours, crushed and then ground to prepare a calcined powder of the dielectric ceramic composition with a particle size passing through a 200 mesh sieve screen.

Separate from the above, using the raw materials $Li_2CO_3$, $BaCO_3$, $CaCO_3$ and $SrCO_3$, MgO, $B_2O_3$, $SiO_2$ mixtures were prepared to produce antireducing agents each having a composition as shown in Table 1A. Each mixture was milled by the wet process with a ball mill for 16 hours and then dried by evaporation. The resultant mixed powder was put into an aluminum crucible, maintained at 1300° C. for 1 hour, vitrified by rapid cooling, and then ground to prepare an antireducing agent powder with a particle size passing through a 200 mesh sieve screen.

The antireducing agent was added to the dielectric ceramic powder in the compositional proportions shown in Table 1A. Each resultant mixture was wet-milled with a ball mill for 16 hours together with a suitable amount of polyvinyl butyral resin dissolved in ethyl alcohol, formed into a sheet by the doctor blade process, dried and then cut to prepare ceramic green sheets.

On one flat surface of each ceramic green sheet, a copper paste was screen-printed to form a copper paste layer for an internal electrode. The copper paste was prepared by dispersing copper powder of about 0.1 to 5 $\mu$m in ethyl cellulose solution dissolved in $\alpha$-terpineol. Subsequently, 17 sheets of the resultant printed green sheets were stacked, pressed and then cut into pieces to form green units for monolithic ceramic capacitors. The green units were fired with an electric furnace at various temperatures ranging from 830° to 1050° C. for 2 hours in a reducing atmosphere composed of a mixed gas of $N_2$, $H_2$ and $H_2O$ to produce monolithic sintered ceramic capacitor units. During firing, the firing atmosphere was kept constant by feeding $N_2$, $H_2$ and $H_2O$ into the furnace at the rate of 3000 l/hr for $N_2$, 0.1 l/hr for $H_2$, 1350 l/hr for $H_2O$.

Some of the resultant capacitor units were immersed in a fuchsin solution to determine the optimum firing temperature for each composition. The results are shown in Table 1B.

Each capacitor unit prepared by firing at the optimum firing temperature was provided with external electrodes on its opposite sides as terminations by applying a silver paste and then baking it at 800° C. for 30 minutes in a nitrogen atmosphere to produce a monolithic ceramic capacitor.

The dimensions of the monolithic ceramic capacitors are as follows:
Width: 4.8 mm
Length: 5.6 mm
Thickness: 1.2 mm
Effective thickness of dielectric layer: 32 $\mu$m
Number of dielectric layers: 17 sheets
Thickness of internal electrode: 3 $\mu$m
Surface area of internal electrode: 21.5 mm$^2$
Thickness of external electrode: 60 $\mu$m For each specimen, measurements were made for electrical characteristics including dielectric constant ($\epsilon$) at 25° C., 1 KHz and 1 Vrms, dielectric loss (tan $\delta$), insulating resistance ($\rho$), and temperature characteristics of capacitance over the temperature range of $-25°$ C. to 85° C. relative to the capacitance at 20° C. (T.C.). Also, a change rate of dielectric constant was measured by applying a DC voltage of 2 kV/mm on the capacitor to determine the bias characteristics ($\Delta$C). Results are shown in Table 1B together with those for comparative specimen Nos. 13 and 14.

Comparative specimen No. 13 was prepared in the same manner as above, except that the ceramic green sheets were prepared only with the powder of the dielectric ceramic composition prepared in Example 1. Thus, the dielectric ceramic layer consisted of 39.9 mol% of $SrTiO_3$, 27.4 mol% of $PbTiO_3$, 21.5 mol% of $CaTiO_3$, 4.3 mol% of $Bi_2O_3$, 1.8 mol% of $SnO_2$ and 11.1 mol% of $TiO_2$, and contained no antireducing agent.

Comparative specimen No. 14 was prepared in the same manner as above, except that the ceramic green sheets were prepared by using of a mixture consisting of 95 wt% of the powder of the dielectric ceramic composition prepared in Example 1 and 5 wt% of a low temperature sintering additive consisting of 27.9 mol% of $Li_2O$, 7.4 mol% of BaO, 5.6 mol% of CaO, 5.6 mol% of SrO, 44.5 mol% of $SiO_2$, 2.0 mol% of $TiO_2$ and 7.0 mol% of CuO.

In Table 1B, the temperature characteristic of capacitance is classified by a temperature change rate of capacitance on the basis of the characteristics B, C and D established by JIS (Japanese Industrial Standard), which are given as follows:

B characteristics: A temperature change rate of capacitance over the temperature range of −25° C. to +85° C. relative to the capacitance at 20° C. is within the range of ±10 %;

C characteristics: A temperature change rate of capacitance over the temperature range of −25° C. to +85° C. relative to the capacitance at 20° C. is within the range of ±20 %;

D characteristics: A temperature change rate of capacitance over the temperature range of −25° C. to +85° C. relative to the capacitance at 20° C. is within the range of −30 % to +20 %.

In Tables 1A and 1B, specimens with an asterisk (*) are beyond the scope of the present invention, whereas the other specimens do fall within the scope of the present invention.

From the results shown in Table 1B, it can be seen that the monolithic ceramic capacitors according to the present invention have a high insulating resistance of not less than $10^{10}$ Ωcm and a low sintering temperature of not more than 1000° C. Further, the monolithic ceramic capacitors of the present invention possess low dielectric loss, improved temperature characteristics of capacitance and small voltage dependency of capacitance even if they are fired in a reducing atmosphere. Thus, the present invention makes it possible to produce monolithic ceramic capacitors having improved electrical characteristics that include internal electrodes made of copper or a copper alloy.

EXAMPLE 2

Using the raw materials $SrCO_3$, $Bi_2O_3$, PbO, $CaCO_3$, $TiO_2$ and $SnO_2$, mixtures were prepared; to produce dielectric ceramic compositions each having a composition shown in Table 2A. Using each resultant mixture, a calcined powder of the dielectric ceramic composition was prepared in the same manner as Example 1 a particle size passing through a 200 mesh sieve screen.

Separate from the above, using the raw materials $Li_2CO_3$, $BaCO_3$, $CaCO_3$ and $SrCO_3$, MgO, $B_2O_3$, $SiO_2$, an antireducing agent powder was prepared in the same manner as Example 1 consisting of 5 mol% of $Li_2O$, 10 mol% of BaO, 10 mol% of CaO, 5 mol% of SrO, 5 mol% of MgO, 39 mol% of $B_2O_3$ and 26 mol% of $SiO_2$.

Using the prepared dielectric ceramic composition and antireducing agent, there were prepared monolithic ceramic capacitors in the same manner as Example 1.

For each monolithic ceramic capacitor, the electrical characteristics were measured in the same manner as Example 1. The results are shown in Table 2B.

TABLE 1A

| No. | Dielectric powder (wt %) | Antireducing agent (wt %) | Composition of antireducing agent (mol %) | | | | | | |
|---|---|---|---|---|---|---|---|---|---|
| | | | $Li_2O$ | BaO | CaO | SrO | MgO | $B_2O_3$ | $SiO_2$ |
| 1 | 97 | 3 | 5 | 5 | 5 | 5 | 5 | 25 | 50 |
| 2 | 97 | 3 | 6 | 54 | 0 | 0 | 0 | 20 | 20 |
| 3 | 97 | 3 | 6 | 0 | 10 | 0 | 0 | 34 | 50 |
| 4 | 97 | 3 | 5 | 15 | 15 | 10 | 5 | 20 | 30 |
| 5 | 97 | 3 | 20 | 5 | 5 | 5 | 5 | 30 | 30 |
| 6 | 97 | 3 | 5 | 10 | 10 | 5 | 5 | 39 | 26 |
| 7 | 95 | 5 | 5 | 10 | 10 | 5 | 5 | 39 | 26 |
| 8 | 90 | 10 | 5 | 10 | 10 | 5 | 5 | 39 | 26 |
| 9 | 85 | 15 | 5 | 10 | 10 | 5 | 5 | 39 | 26 |
| 10 | 80 | 20 | 5 | 10 | 10 | 5 | 5 | 39 | 26 |
| 11 | 75 | 25 | 5 | 10 | 10 | 5 | 5 | 39 | 26 |
| 12 | 70 | 30 | 5 | 10 | 10 | 5 | 5 | 39 | 26 |
| 13* | 100 | 0 | — | — | — | — | — | — | — |
| 14* | 95 | 5 | — | — | — | — | — | — | — |

TABLE 1B

| No. | Firing temp. (°C.) | Electric properties | | | | |
|---|---|---|---|---|---|---|
| | | ε | tanδ (%) | ρ (Ωcm) | ΔC (%) | T.C. |
| 1 | 1000 | 1950 | 0.3 | ≧$10^{10}$ | +5 | C |
| 2 | 1050 | 2100 | 0.5 | ≧$10^{10}$ | +3 | C |
| 3 | 1030 | 2050 | 0.5 | ≧$10^{10}$ | +3 | C |
| 4 | 1000 | 1900 | 0.2 | ≧$10^{10}$ | +4 | C |
| 5 | 1010 | 2100 | 0.4 | ≧$10^{10}$ | +2 | C |
| 6 | 1000 | 1850 | 0.3 | ≧$10^{10}$ | +2 | C |
| 7 | 980 | 1350 | 0.2 | ≧$10^{10}$ | +1 | B |
| 8 | 950 | 1200 | 0.2 | ≧$10^{10}$ | +1 | B |
| 9 | 910 | 1000 | 0.1 | ≧$10^{10}$ | 0 | B |
| 10 | 880 | 850 | 0.1 | ≧$10^{10}$ | −1 | B |
| 11 | 850 | 700 | 0.09 | ≧$10^{10}$ | −1 | B |
| 12 | 830 | 400 | 0.07 | ≧$10^{10}$ | −1 | B |
| 13 | 1170 | unmeasurable | | | | |
| 14 | 1050 | 900 | 10.0 | $10^6$ | −30 | D |

TABLE 2A

| No. | Antireducing agent (wt %) | Dielectric powder (wt %) | Composition of dielectric ceramic (mol %) | | | | | |
|---|---|---|---|---|---|---|---|---|
| | | | $SrTiO_3$ | $PbTiO_3$ | $CaTiO_3$ | $Bi_2O_3$ | $SnO_2$ | $TiO_2$ |
| 15 | 3.0 | 97.0 | 42.2 | 28.1 | 12.4 | 4.3 | 4.4 | 8.6 |

TABLE 2A-continued

| No. | Antireducing agent (wt %) | Dielectric powder (wt %) | Composition of dielectric ceramic (mol %) | | | | | |
|---|---|---|---|---|---|---|---|---|
| | | | SrTiO$_3$ | PbTiO$_3$ | CaTiO$_3$ | Bi$_2$O$_3$ | SnO$_2$ | TiO$_2$ |
| 16 | 3.0 | 97.0 | 42.3 | 28.2 | 12.5 | 4.4 | 6.4 | 6.2 |
| 17 | 3.0 | 97.0 | 48.8 | 21.5 | 12.4 | 4.4 | 4.4 | 8.5 |
| 18 | 3.0 | 97.0 | 44.6 | 29.7 | 13.1 | 2.7 | 2.7 | 7.2 |
| 19 | 3.0 | 97.0 | 38.9 | 25.9 | 11.4 | 6.7 | 13.3 | 3.8 |
| 20 | 7.0 | 93.0 | 42.2 | 28.1 | 12.4 | 4.3 | 4.4 | 8.6 |
| 21 | 7.0 | 93.0 | 42.3 | 28.2 | 12.5 | 4.4 | 6.4 | 6.2 |
| 22 | 7.0 | 93.0 | 48.8 | 21.5 | 12.4 | 4.4 | 4.4 | 8.5 |
| 23 | 7.0 | 93.0 | 44.6 | 29.7 | 13.1 | 2.7 | 2.7 | 7.2 |
| 24 | 7.0 | 93.0 | 38.9 | 25.9 | 11.4 | 6.7 | 13.3 | 3.8 |
| 25 | 15.0 | 85.0 | 42.2 | 28.1 | 12.4 | 4.3 | 4.4 | 8.6 |
| 26 | 15.0 | 85.0 | 42.3 | 28.2 | 12.5 | 4.4 | 6.4 | 6.2 |
| 27 | 15.0 | 85.0 | 48.8 | 21.5 | 12.4 | 4.4 | 4.4 | 8.5 |
| 28 | 15.0 | 85.0 | 44.6 | 29.7 | 13.1 | 2.7 | 2.7 | 7.2 |
| 29 | 15.0 | 85.0 | 38.9 | 25.9 | 11.4 | 6.7 | 13.3 | 3.8 |

TABLE 2B

| No. | Firing temp. (°C.) | Electric properties | | | | |
|---|---|---|---|---|---|---|
| | | $\epsilon$ | tan$\delta$ (%) | $\rho$ ($\Omega$cm) | $\Delta$C (%) | T.C. |
| 15 | 1050 | 5300 | 0.6 | $\geq 10^{10}$ | −20 | D |
| 16 | 1050 | 4100 | 0.3 | $\geq 10^{10}$ | −12 | C |
| 17 | 1030 | 1800 | 0.07 | $\geq 10^{10}$ | −5 | C |
| 18 | 1020 | 1650 | 0.4 | $\geq 10^{10}$ | −13 | D |
| 19 | 1000 | 1700 | 0.4 | $\geq 10^{10}$ | −6 | C |
| 20 | 980 | 3950 | 0.4 | $\geq 10^{10}$ | −15 | C |
| 21 | 990 | 3050 | 0.2 | $\geq 10^{10}$ | −9 | B |
| 22 | 980 | 1100 | 0.05 | $\geq 10^{10}$ | −3 | B |
| 23 | 970 | 1050 | 0.2 | $\geq 10^{10}$ | −10 | B |
| 24 | 970 | 1050 | 0.2 | $\geq 10^{10}$ | −4 | B |
| 25 | 910 | 2800 | 0.3 | $\geq 10^{10}$ | −10 | B |
| 26 | 900 | 2500 | 0.07 | $\geq 10^{10}$ | −7 | B |
| 27 | 900 | 900 | 0.2 | $\geq 10^{10}$ | −2 | B |
| 28 | 900 | 800 | 0.2 | $\geq 10^{10}$ | −7 | B |
| 29 | 890 | 850 | 0.1 | $\geq 10^{10}$ | −3 | B |

As can be understood from the results shown in Table 2B, the monolithic ceramic capacitors according to the present invention have a high insulating resistance of not less than 10$^{10}$ $\Omega$cm and a low sintering temperature of not more than 1050° C. Further, the monolithic ceramic capacitors of the present invention possess low dielectric loss, improved temperature characteristics of capacitance and small voltage dependency of capacitance even if they are fired in a reducing atmosphere.

EXAMPLE 3

Using the raw materials MnO$_2$, BaCO$_3$ and CaCO$_3$, SrCO$_3$, MgO, B$_2$O$_3$, SiO$_2$, antireducing agents were prepared in the same manner as Example 1 each having a composition shown in Table 3A.

Each antireducing agent was added to the powder of the dielectric ceramic composition prepared in Example 1 in the compositional proportions shown in Table 3A to prepare ceramic green sheets. Using the resultant ceramic green sheets, monolithic ceramic capacitors were prepared in the same manner as Example 1.

For each monolithic ceramic capacitor, the electrical characteristics were measured in the same manner as Example 1. The results are shown in Table 3B.

TABLE 3A

| No. | Dielectric powder (wt %) | Antireducing agent (wt %) | Composition of antireducing agent (mol %) | | | | | | |
|---|---|---|---|---|---|---|---|---|---|
| | | | MnO$_2$ | BaO | CaO | SrO | MgO | B$_2$O$_3$ | SiO$_2$ |
| 30 | 97 | 3 | 5 | 5 | 5 | 5 | 5 | 25 | 50 |
| 31 | 97 | 3 | 6 | 54 | 0 | 0 | 0 | 20 | 20 |
| 32 | 97 | 3 | 6 | 0 | 10 | 0 | 0 | 34 | 50 |
| 33 | 97 | 3 | 5 | 15 | 15 | 10 | 5 | 20 | 30 |
| 34 | 97 | 3 | 20 | 5 | 5 | 5 | 5 | 30 | 30 |
| 35 | 97 | 3 | 5 | 10 | 10 | 5 | 5 | 39 | 26 |
| 36 | 95 | 5 | 5 | 10 | 10 | 5 | 5 | 39 | 26 |
| 37 | 90 | 10 | 5 | 10 | 10 | 5 | 5 | 39 | 26 |
| 38 | 85 | 15 | 5 | 10 | 10 | 5 | 5 | 39 | 26 |
| 39 | 80 | 20 | 5 | 10 | 10 | 5 | 5 | 39 | 26 |
| 40 | 75 | 25 | 5 | 10 | 10 | 5 | 5 | 39 | 26 |
| 41 | 70 | 30 | 5 | 10 | 10 | 5 | 5 | 39 | 26 |

TABLE 3B

| No. | Firing temp. (°C.) | Electric properties | | | | |
|---|---|---|---|---|---|---|
| | | $\epsilon$ | tan$\delta$ (%) | $\rho$ ($\Omega$cm) | $\Delta$C (%) | T.C. |
| 30 | 1000 | 1900 | 0.4 | $\geq 10^{10}$ | +5 | C |
| 31 | 1050 | 2050 | 0.4 | $\geq 10^{10}$ | +4 | C |
| 32 | 1030 | 2050 | 0.5 | $\geq 10^{10}$ | +3 | C |
| 33 | 1000 | 1850 | 0.2 | $\geq 10^{10}$ | +3 | C |
| 34 | 1010 | 2100 | 0.4 | $\geq 10^{10}$ | +2 | C |
| 35 | 1000 | 1800 | 0.4 | $\geq 10^{10}$ | +1 | C |
| 36 | 980 | 1350 | 0.3 | $\geq 10^{10}$ | +1 | B |
| 37 | 950 | 1150 | 0.2 | $\geq 10^{10}$ | +1 | B |
| 38 | 910 | 1000 | 0.1 | $\geq 10^{10}$ | 0 | B |
| 39 | 880 | 800 | 0.1 | $\geq 10^{10}$ | −1 | B |
| 40 | 850 | 700 | 0.1 | $\geq 10^{10}$ | −1 | B |
| 41 | 830 | 400 | 0.08 | $\geq 10^{10}$ | −1 | B |

As can be understood from the results shown in Table 3B, the monolithic ceramic capacitors according to the present invention have a high insulating resistance of not less than 10$^{10}$ $\Omega$cm and a low sintering temperature of not more than 1050° C. Further, the monolithic ceramic capcitors of the present invention possess low dielectric loss of not more than 0.5%, improved temperature characteristics of capacitance and small voltage dependency of capacitance.

EXAMPLE 4

Using the raw materials ZnO, BaCO$_3$, CaCO$_3$, SrCO$_3$, MgO, B$_2$O$_3$ and SiO$_2$, antireducing agents were prepared in the same manner as Example 1 having a composition shown in Table 4A.

Each antireducing agent was added to the powder of the dielectric ceramic composition prepared in Example 1 in the compositional proportions shown in Table 4A to prepare ceramic green sheets. Using the resultant ceramic green sheets, monolithic ceramic capacitors were prepared in the same manner as Example 1.

For each monolithic ceramic capacitor, the electrical characteristics were measured in the same manner as Example 1. The results are shown in Table 4B.

TABLE 4A

| No. | Dielectric powder (wt %) | Antireducing agent (wt %) | Composition of antireducing agent (mol %) | | | | | | |
|---|---|---|---|---|---|---|---|---|---|
| | | | ZnO | BaO | CaO | SrO | MgO | $B_2O_3$ | $SiO_2$ |
| 42 | 97 | 3 | 5 | 5 | 5 | 5 | 5 | 25 | 50 |
| 43 | 97 | 3 | 6 | 54 | 0 | 0 | 0 | 20 | 20 |
| 44 | 97 | 3 | 6 | 0 | 10 | 0 | 0 | 34 | 50 |
| 45 | 97 | 3 | 5 | 15 | 15 | 10 | 5 | 20 | 30 |
| 46 | 97 | 3 | 20 | 5 | 5 | 5 | 5 | 30 | 30 |
| 47 | 97 | 3 | 5 | 10 | 10 | 5 | 5 | 39 | 26 |
| 48 | 95 | 5 | 5 | 10 | 10 | 5 | 5 | 39 | 26 |
| 49 | 90 | 10 | 5 | 10 | 10 | 5 | 5 | 39 | 26 |
| 50 | 85 | 15 | 5 | 10 | 10 | 5 | 5 | 39 | 26 |
| 51 | 80 | 20 | 5 | 10 | 10 | 5 | 5 | 39 | 26 |
| 52 | 75 | 25 | 5 | 10 | 10 | 5 | 5 | 39 | 26 |
| 53 | 70 | 30 | 5 | 10 | 10 | 5 | 5 | 39 | 26 |

TABLE 4B

| No. | Firing temp. (°C.) | Electric properties | | | | |
|---|---|---|---|---|---|---|
| | | $\epsilon$ | tan$\delta$ (%) | $\rho$ ($\Omega$cm) | $\Delta C$ (%) | T.C. |
| 42 | 1000 | 1950 | 0.4 | $\geq 10^{10}$ | +4 | C |
| 43 | 1050 | 2050 | 0.5 | $\geq 10^{10}$ | +4 | C |
| 44 | 1030 | 2050 | 0.4 | $\geq 10^{10}$ | +3 | C |
| 45 | 1000 | 1850 | 0.3 | $\geq 10^{10}$ | +4 | C |
| 46 | 1010 | 2100 | 0.3 | $\geq 10^{10}$ | +2 | C |
| 47 | 1000 | 1850 | 0.4 | $\geq 10^{10}$ | +2 | C |
| 48 | 980 | 1300 | 0.4 | $\geq 10^{10}$ | +1 | B |
| 49 | 950 | 1150 | 0.3 | $\geq 10^{10}$ | +1 | B |
| 50 | 910 | 1000 | 0.2 | $\geq 10^{10}$ | 0 | B |
| 51 | 880 | 800 | 0.1 | $\geq 10^{10}$ | −1 | B |
| 52 | 850 | 700 | 0.1 | $\geq 10^{10}$ | −1 | B |
| 53 | 830 | 400 | 0.07 | $\geq 10^{10}$ | −1 | B |

From the results shown in Table 4B, it can be seen that the monolithic ceramic capacitors according to the present invention have a high insulating resistance of not less than $10^{10}$ $\Omega$cm and a low sintering temperature of not more than 1050° C. Further, the monolithic ceramic capcitors of the present invention possess low dielectric loss of not more than 0.5%, improved temperature characteristics of capacitance and small voltage dependency of capacitance.

EXAMPLE 5

Using powder of a copper alloy consisting of 5 atomic % of Pt and 95 atomic % of Cu instead of copper powder, a copper alloy paste for internal electrodes was prepared in the same manner as Example 1. Using the resultant paste, monolithic ceramic capacitors were prepared in the same manner as Example 1.

The measurements of electrical characteristics showed that the monolithic ceramic capacitor comprising internal electrodes of the Pt-Cu alloy possess the same electrical characteristics as those of monolithic ceramic capacitors having internal electrodes of pure copper.

EXAMPLE 6

A copper alloy paste for internal electrodes was prepared by adding 5 wt% of the dielectric ceramic composition prepared in Example 1 to the copper alloy paste prepared in Example 5. Using the resultant paste, monolithic ceramic capacitors were prepared in the same manner as Example 1.

The measurements of electrical characteristics showed that the use of Pt-Cu alloy paste containing a small amount of the ceramic dielectric makes it possible to produce monolithic ceramic capacitors having the same electrical characteristics as those of monolithic ceramic capacitors having internal electrodes of pure copper.

EXAMPLE 7

A copper alloy paste for internal electrodes was prepared by incorporating 3 wt% of the dielectric ceramic composition prepared in Example 1 and 2 wt% of the antireducing agent prepared in Example 2 into the copper alloy paste prepared in Example 5A. Using the resultant paste, monolithic ceramic capacitors were prepared in the same manner as Example 1.

The measurements of electrical characteristics showed that the use of Pt-Cu alloy paste containing a small amount of the ceramic dielectric and antireducing agent makes it possible to produce monolithic ceramic capacitors having the same electrical characteristics as those of monolithic ceramic capacitors having internal electrodes of pure copper.

What is claimed is:

1. A monolithic ceramic capacitor comprising a plurality of dielectric ceramic layers united into one body, a plurality of internal electrodes formed between adjacent dielectric ceramic layers, and external electrodes formed on opposite sides of said united ceramic layers each being connected to alternate internal electrodes, said internal electrodes being formed from a copper or a copper alloy and said dielectric ceramic layers being formed from a dielectric ceramic composition including strontium titanate, bismuth oxide and an antireducing agent which prevents said composition from reduction, said antireducing agent having a composition expressed by the general formula:

$$\alpha MnO_2 + \beta RO + \gamma B_2O_3 + (1-\alpha-\beta-\gamma)SiO_2, \text{ or}$$

$$\alpha Li_2O + \beta RO + \gamma B_2O_3 + (1-\alpha-\text{'}-\equiv)SiO_2, \text{ or}$$

$$\alpha ZnO + \beta RO + \gamma B_2O_3 + (1-\alpha-62-\gamma)SiO_2,$$

wherein RO is at least one oxide selected from the group consisting of MgO, CaO, SrO and BaO, and $\alpha$, $\beta$, and $\gamma$ are molar percentages of the respective components and take a value within the following respective ranges, $5 \leq \alpha, \leq 20, 10 \leq \beta \leq 60, 20 \leq \gamma \leq 40$.

2. A monolithic ceramic capacitor according to claim 1 wherein said dielectric ceramic composition is of a $SrTiO_3$-$PbTiO_3$-$CaTiO_3$-$Bi_2O_3$-$SnO_3$-$TiO_2$ system.

3. A monolithic ceramic capacitor according to claim 1 wherein said dielectric ceramic composition is of a $SrTiO_3$ - $MgTiO_3$ - $Bi_2O_3$ - $TiO_2$ - $Pb_3O_4$ system.

4. A monolithic ceramic composition according to claim 1 wherein said dielectric layers are made up of a dielectric ceramic composition expressed by the general formula:

$$\alpha(Sr_{1-x-y-z}Pb_xCa_yMg_z)TiO_3 + \beta\{Bi_2O_3 \cdot n(Ti_{1-m}Sn_m)O_2\}$$

wherein x, y, z, $\alpha$, $\beta$ and m are mole fractions of the respective components or ingredients and each take a value within the following respective ranges: $\alpha+\beta=1.000$, $0<\beta\leq0.300$, $0.000\leq x>0.500$, $0.000\leq y\leq0.500$, $0.000\leq z\leq0.650$, $0.000\leq x+y+z\leq0.750$, $0.000\leq m\leq0.995$, and wherein n takes a molar value within the following range: $0.00<n\leq5.00$.

5. A monolithic ceramic composition according to claim 1 wherein said internal electrodes contain not more than 40 wt% of at least one additive selected from the group consisting of a glass frit, a dielectric powder and an antireducing agent.

6. A monolithic ceramic capacitor comprising a plurality of dielectric ceramic layers united into one body, a plurality of internal electrodes formed between adjacent dielectric ceramic layers, and external electrodes formed on opposite sides of said united ceramic layers each being connected to alternate internal electrodes, said internal electrodes being formed from a copper or a copper alloy and said dielectric ceramic layers being formed from a dielectric ceramic composition of a $SrTiO_3$ - $PbTiO_3$ - $CaTiO_3$ - $Bi_2O_3$ -$SnO_3$ -$TiO_2$ system.

7. A monolithic capacitor comprising a plurality of dielectric ceramic layers united into one body, a plurality of internal electrodes formed between adjacent dielectric ceramic layers, and external electrodes formed on opposite sides of said united ceramic layers each being connected to alternate internal electrodes, said internal electrodes being formed from a copper or a copper alloy and said dielectric ceramic layers being formed from a dielectric ceramic composition of a $SrTiO_3$ - $MgTiO_3$ - $Bi_2O_3$ - $Bi_2O_3$ - $TiO_2$ - $Pb_3O_4$ system.

8. A monolithic ceramic capacitor comprising a plurality of dielectric ceramic layers united into one body, a plurality of internal electrodes formed between adjacent dielectric ceramic layers, and external electrodes, said internal electrodes being formed on opposite sides of said united ceramic layers each being connected to alternate internal electrodes formed from a copper or a copper alloy and said dielectric ceramic layers being formed of a dielectric ceramic composition expressed by the general formula: $\alpha(Sr_{1-x-y-z}Pb_xCa_yMg_z)TiO_3+\beta(Bi_2O_3 \cdot n(Ti_{1-m}Sn_m)O_2)$ wherein x, y, z, $\alpha$, $\beta$ and m are mole fractions of the respective components or ingredients and each take a value within the following respective ranges: $\alpha+\beta=1.000$, $0<\beta\leq0.300$, $0.000\leq x\leq0.500$, $0.000\leq y\leq0.500$, $0.000\leq z\leq0.650$, $0.000\leq x+y+z\leq0.750$, $0.000\leq m\leq0.995$, and wherein n takes a molar value within the following range: $0.00<\leq5.00$.

* * * * *